United States Patent
Yamada et al.

(10) Patent No.: US 11,113,399 B2
(45) Date of Patent: Sep. 7, 2021

(54) ELECTRONIC APPARATUS AND CONTROL METHOD OF ELECTRONIC APPARATUS

(71) Applicant: TOSHIBA MEMORY CORPORATION, Tokyo (JP)

(72) Inventors: Naoko Yamada, Yokohama Kanagawa (JP); Yuki Kanbe, Fujisawa Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 218 days.

(21) Appl. No.: 16/539,908

(22) Filed: Aug. 13, 2019

(65) Prior Publication Data

US 2020/0293659 A1    Sep. 17, 2020

(30) Foreign Application Priority Data

Mar. 12, 2019  (JP) .............................. JP2019-045133

(51) Int. Cl.
*G06F 21/57* (2013.01)
*G06F 21/34* (2013.01)
*G06F 21/79* (2013.01)
*G06F 21/64* (2013.01)

(52) U.S. Cl.
CPC ............ *G06F 21/572* (2013.01); *G06F 21/34* (2013.01); *G06F 21/575* (2013.01); *G06F 21/64* (2013.01); *G06F 21/79* (2013.01)

(58) Field of Classification Search
CPC ........ G06F 21/572; G06F 21/34; G06F 21/79; G06F 21/575; G06F 21/64
See application file for complete search history.

(56) References Cited

U.S. PATENT DOCUMENTS

| 7,890,770 | B2 | 2/2011 | Kudelski | |
|---|---|---|---|---|
| 8,522,322 | B2 | 8/2013 | Wishman | |
| 2006/0005262 | A1 | 1/2006 | Kudelski | |
| 2009/0271875 | A1 | 10/2009 | Kuroda | |
| 2012/0072734 | A1* | 3/2012 | Wishman | G06F 21/572 713/189 |
| 2013/0132736 | A1* | 5/2013 | Steele | G06F 21/606 713/190 |
| 2015/0370727 | A1* | 12/2015 | Hashimoto | G06F 12/145 711/163 |

(Continued)

FOREIGN PATENT DOCUMENTS

| JP | 2006-524455 A | 10/2006 |
|---|---|---|
| JP | 4713579 B2 | 6/2011 |

(Continued)

*Primary Examiner* — Cheng-Feng Huang
(74) *Attorney, Agent, or Firm* — Foley & Lardner LLP

(57) ABSTRACT

According to one embodiment, an electronic apparatus includes a first processor, a second processor with a security capability higher than a security capability of the first processor, a first nonvolatile memory to store a program which is to be executed by the first processor, and a volatile second memory to store the program and data that is to be referred to by the first processor while the first processor executes the program. The second processor is configured to authenticate a rewrite command requesting to change the data in the second memory and selectively execute the rewrite command based on the authentication.

14 Claims, 12 Drawing Sheets

(56) References Cited

U.S. PATENT DOCUMENTS

2015/0370728 A1* 12/2015 Yamada .............. G06F 12/1416
                                                                711/163
2017/0269940 A1* 9/2017 Valasek ................. H04W 12/04
2019/0102538 A1* 4/2019 Gentili .................... G06F 21/79

FOREIGN PATENT DOCUMENTS

JP          5643901 B2   12/2014
TW      201901407 A    1/2019

\* cited by examiner

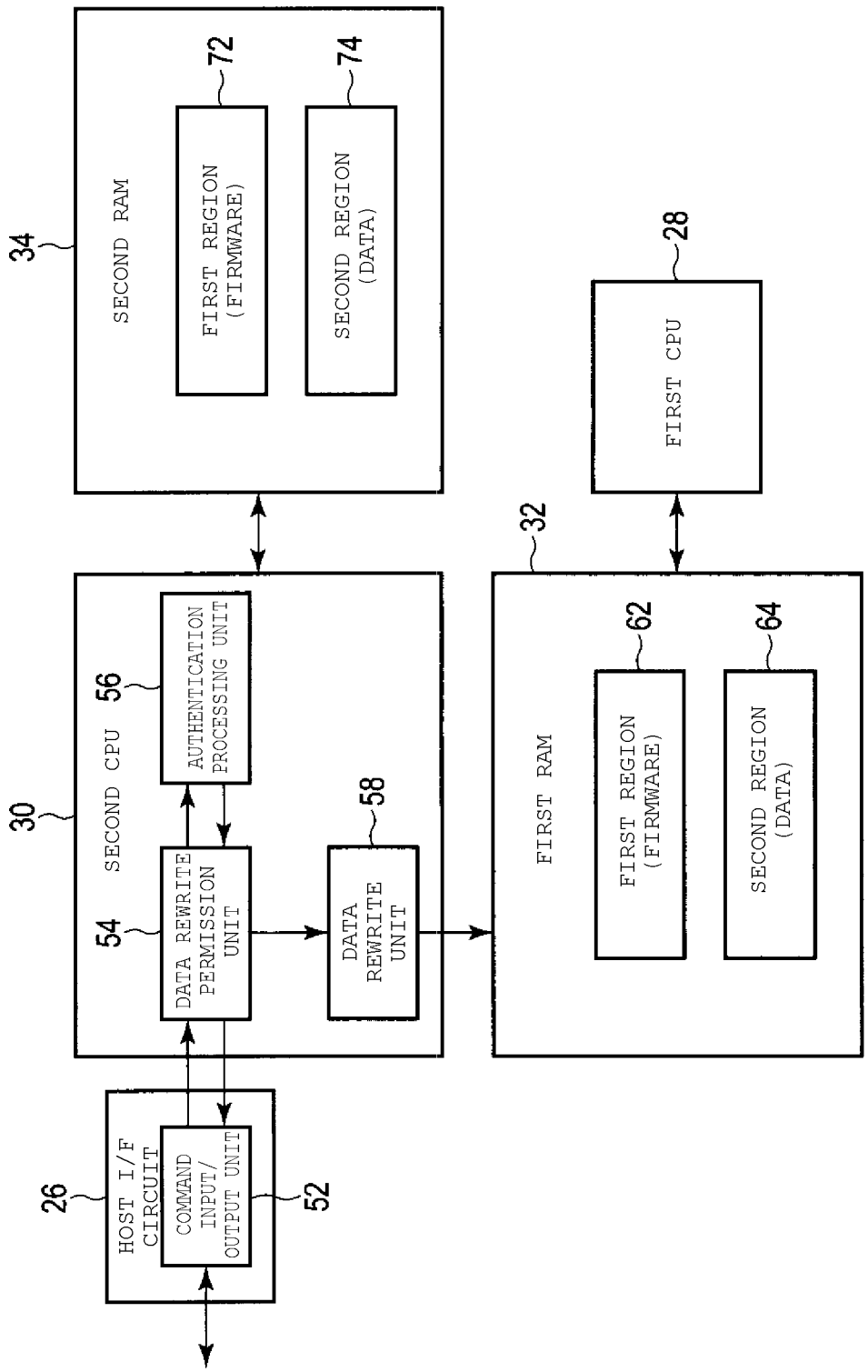

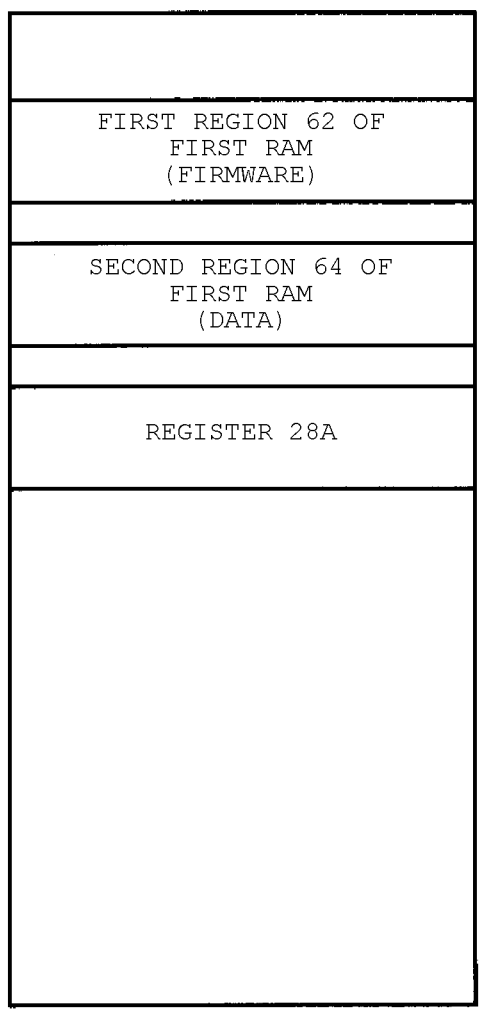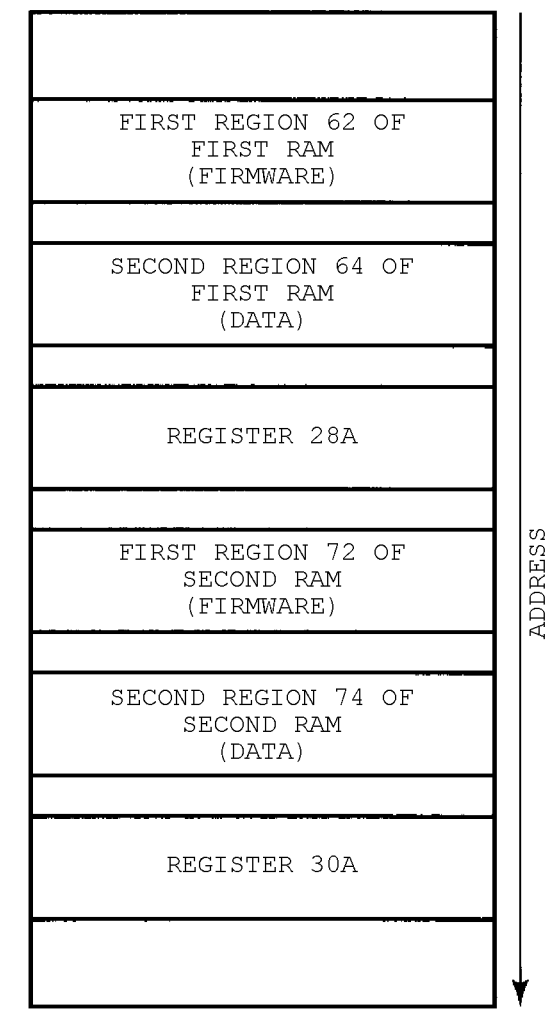

ELECTRONIC APPARATUS AND CONTROL METHOD OF ELECTRONIC APPARATUS

CROSS-REFERENCE TO RELATED APPLICATION

This application is based upon and claims the benefit of priority from Japanese Patent Application No. 2019-045133, filed Mar. 12, 2019, the entire contents of which are incorporated herein by reference.

FIELD

Embodiments described herein relate generally to an electronic apparatus and a control method of the electronic apparatus.

BACKGROUND

When an electronic apparatus breaks down, a manufacturer may analyze (referred to as debug) a cause of the breakdown. The electronic apparatus stores a log for debugging (referred to as a debugging log). For debugging, the manufacturer needs to recall the broken electronic apparatus and read a debugging log from the electronic apparatus. A debugging interface is required for reading the debugging log. The debugging interface is enabled prior to shipment of the electronic apparatus to check an operation at a manufacturing step but is disabled at the time of shipment.

For example, a special debugging firmware that enables the debugging interface is prepared in an embedded apparatus or the like in addition to a normal firmware. The manufacturer updates the firmware of the recalled electronic apparatus to the debugging firmware. Thereby, the debugging interface is enabled, the debugging log can be read, and debugging is performed. The debugging firmware not only enables the debugging interface, but also enables a function that is disabled in normal.

When the debugging firmware itself or an electronic apparatus in which the debugging firmware is installed is leaked, a security issue of the electronic can occur.

In order to prevent the issue from occurring, it is conceivable to perform user authentication so as to enable the debugging interface by the debugging firmware. However, since a password for the authentication is stored in the debugging firmware, the password is revealed if the debugging firmware is leaked and analyzed, and thus, the issue may remain.

Examples of related art include a specification of U.S. Pat. No. 8,522,322, Japanese Patent No. 5643901, a specification of US-A-2009/271875, Japanese Patent No. 4713579, a specification of U.S. Pat. No. 7,890,770, and JP-T-2006-524455.

DESCRIPTION OF THE DRAWINGS

FIG. 2 is a block diagram illustrating an example of a functional configuration of a second CPU of the electronic apparatus according to the first embodiment.

FIGS. 3A and 3B are diagrams illustrating examples of address maps of a first CPU and the second CPU of the electronic apparatus according to the first embodiment.

DETAILED DESCRIPTION

Figure 1:
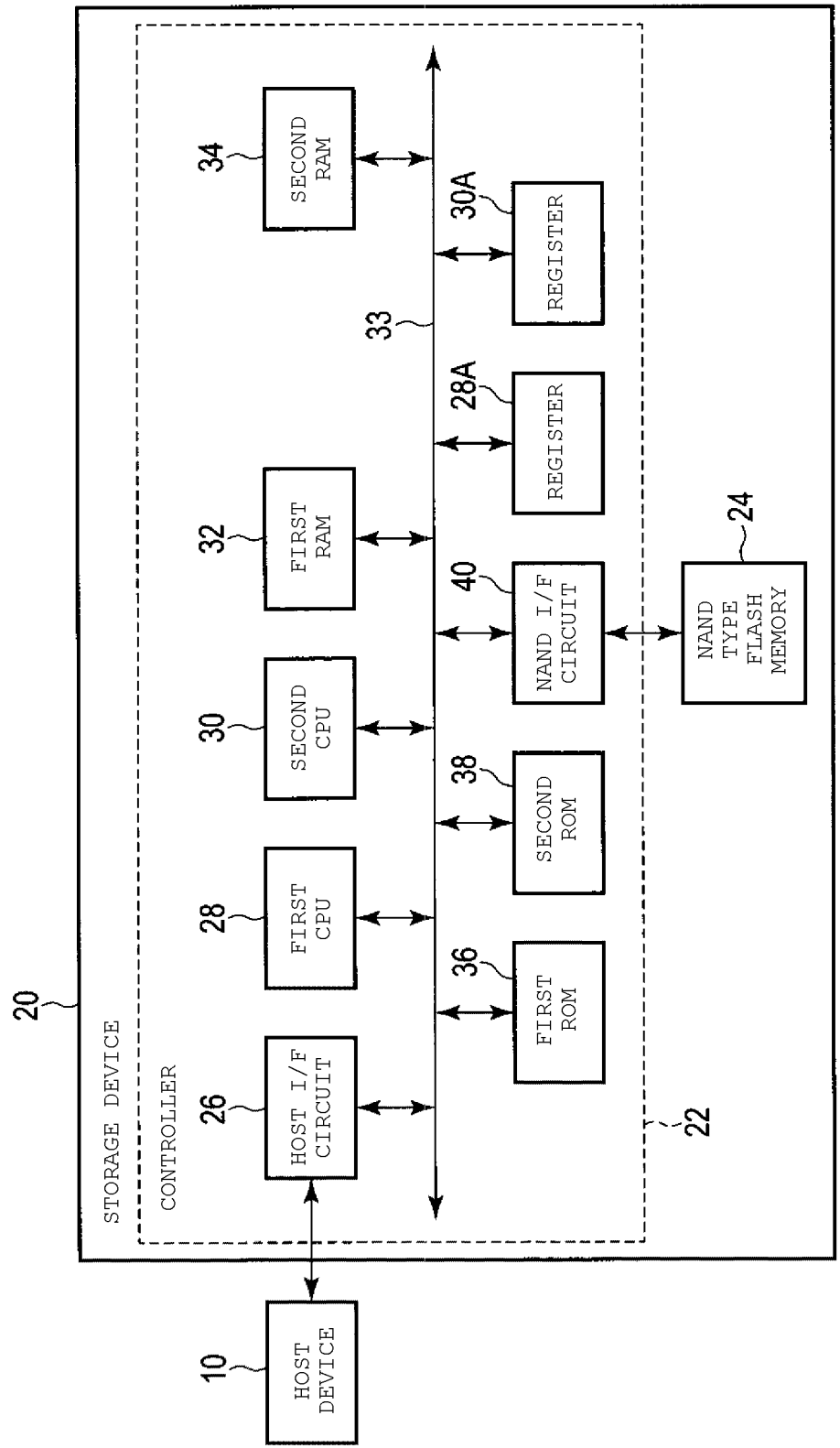
FIG. 1 is a block diagram illustrating an example of a configuration of an electronic apparatus according to a first embodiment.

Embodiments provide an electronic apparatus which maintains security and performs debugging.

In general, according to one embodiment, an electronic apparatus includes a first processor, a second processor with a security capability higher than a security capability of the first processor, a first nonvolatile memory to store a program which is to be executed by the first processor, and a volatile second memory to store the program and data that is to be referred to by the first processor while the first processor executes the program. The second processor is configured to authenticate a rewrite command requesting to change the data in the second memory and selectively execute the rewrite command based on the authentication.

Hereinafter, embodiments will be described with reference to the drawings. The following description exemplifies a device and a method for embodying the technical ideas of the embodiments, and the technical ideas of the embodiments are not limited to a structure, a shape, an arrangement, a material, and the like of configuration elements which will be described below. Changes that can be easily made by those skilled in the art are naturally included in the scope of the disclosure. In order to make the description clearer, a size, a thickness, a planar dimension, a shape, or the like of each element may be schematically illustrated in the drawings by being changed from the actual embodiments. A plurality of drawings may include elements having different dimensional relationships and proportions. In the plurality of drawings, corresponding elements may be denoted by the same reference numerals or symbols and duplicate description may be omitted. Although some elements may be given a plurality of designations, examples of these designations are merely exemplifications and do not deny that the elements are given other designations. Moreover, it does not deny that another designation is attached to an element to which a plurality of designations are not attached. In the following description, a "connection" means not only a direct connection but also a connection via an element.

First Embodiment

An electronic apparatus according to an embodiment is applicable to any electronic apparatus, and an example of a storage device 20 configured with a solid state drive (abbreviated as SSD) using a nonvolatile semiconductor memory such as a flash memory will be described as a first embodiment. FIG. 1 illustrates an example of an information processing system including the storage device 20 and a host device 10.

Configuration of Apparatus

The storage device 20 includes a flash memory 24 as a storage medium and a controller 22. The flash memory 24 is implemented by, for example, a NAND type flash memory but is not limited to the NAND type flash memory, and another nonvolatile semiconductor memory may be used therefor. The host device 10 may be a server (also referred to as a storage server) that stores a large amount of various data in the storage device 20 or may be a personal computer in which the storage device 20 is embedded. The storage device 20 may be embedded in the host device 10 or may be connected to the host device 10 via a cable or a network as illustrated in FIG. 1. The controller 22 is configured with, for example, a system-on-a-chip (SoC). The controller 22 is configured to write data to the flash memory 24 and to read data from the flash memory 24.

The controller 22 includes a host I/F circuit 26, a first CPU 28, a register 28A, a second CPU 30, a register 30A, a first RAM 32, a second RAM 34, a first ROM 36, a second ROM 38 and a NAND I/F circuit 40, which are connected to each other by a system bus 33. The flash memory 24 is connected to the NAND I/F circuit 40. The first RAM 32 and the second RAM 34 may be implemented as a tightly-coupled memories (TCM) connected to the first CPU 28 and the second CPU 30, respectively not via the system bus 33 but via a local bus or a dedicated bus.

An interface between the host I/F circuit 26 and the host device 10 may use any standard, such as the Small Computer System Interface (SCSI) (registered trademark), the PCI Express (registered trademark) (also referred to as the PCIe (registered trademark)), the Serial Attached SCSI (SAS) (registered trademark), the Serial Advanced Technology Attachment (SATA) (registered trademark), the Non Volatile Memory Express (NVMe (registered trademark)), and the Universal Serial Bus (USB) (registered trademark), and is not limited to these.

The first CPU 28 controls a normal operation of the storage device 20, such as writing of user data to the flash memory 24 or reading of user data from the flash memory 24. The storage device 20 may include two types: a non-encryption type that writes the user data to the flash memory 24 as it is (in plain text); and an encryption type that encrypts the user data in the storage device 20 and then writes the encrypted data to the flash memory 24. The embodiment may also be implemented as either the non-encryption type or the encryption type. Here, the embodiment is implemented as the encryption type as an example. In this case, the first CPU 28 also performs encryption processing and decryption processing.

Furthermore, the first CPU 28 also writes a log (referred to as a debugging log) of the storage device 20 to the flash memory 24 so as to debug the storage device 20. The debugging log is written to the flash memory 24 as a log file. The debugging log includes, for example, an origin of a log event, a date, a time, a type of log, a comment, and the like.

The second CPU 30 controls rewrite (or, change) of data in a RAM for the first CPU 28. The second CPU 30 has a higher security capability than the first CPU 28. For example, the second CPU 30 is booted by booting of high security (secure booting), and the security is ensured. An authorized dedicated hardware may be provided instead of the second CPU 30.

The first RAM 32 is a volatile memory used as a work area of the first CPU 28. The second RAM 34 is a volatile memory used as a work area of the second CPU 30. Here, the first RAM 32 and the second RAM 34 are implemented by SRAMs in the controller 22. Alternatively, the memories may be implemented by DRAMs provided outside the controller 22. An example of data stored in the first RAM 32 and the second RAM 34 will be described below with reference to FIG. 2. The work area of the first CPU 28 and the work area of the second CPU 30 are implemented by the first RAM 32 and the second RAM 34, respectively. Alternatively, the work area of the first CPU 28 and the work area of the second CPU 30 may be allocated to different address regions of one RAM.

The first ROM 36 is a nonvolatile memory that stores firmware which is a program executed by the first CPU 28 and information for authenticating the first CPU 28. The second ROM 38 is a nonvolatile memory that stores firmware which is a program executed by the second CPU 30 and information for authenticating the second CPU 30. The first ROM 36 and the second ROM 38 may be implemented by a writable ROM, for example, a NOR type serial flash memory or an optically writable ROM. When the first ROM 36 is implemented by the NOR type serial flash memory, the first CPU 28 may write the debugging log to the first ROM 36 instead of the flash memory 24. A ROM of the first CPU 28 and a ROM of the second CPU 30 are implemented by the first ROM 36 and the second ROM 38, respectively. Alternatively, the firmware of the first CPU 28 and the information for authentication and the firmware of the second CPU 30 and the information for authentication may be stored in different regions of one ROM.

Functional Configuration

FIG. 2 is a block diagram illustrating an example of a functional configuration of the second CPU 30 according to the first embodiment. The host I/F circuit 26 includes a command input/output unit 52. The second CPU 30 includes a data rewrite permission unit 54, an authentication processing unit 56, and a data rewrite unit 58. The data rewrite permission unit 54, the authentication processing unit 56, and the data rewrite unit 58 may be implemented in a software manner as the second CPU 30 executes the firmware. Alternatively, the data rewrite permission unit 54, the authentication processing unit 56, and the data rewrite unit 58 may be implemented by separate hardware.

The first RAM 32 has a first region (also referred to as an Instruction SRAM (I-SRAM)) 62 for storing the firmware of the first CPU 28, a second region (also referred to as Data SRAM (D-SRAM)) 64 for storing data corresponding to the firmware being executed by the first CPU 28, and a storage region for other data. When the first CPU 28 is booted, the first CPU reads firmware from the first ROM 36, stores the firmware in the first region 62 of the first RAM 32, and executes the firmware. The data generated by executing the firmware is stored in the second region 64 of the first RAM 32. The register 28A is mapped together with the first region 62 and the second region 64 of the first RAM 32 on an address space that can be accessed by the first CPU 28, as illustrated in FIG. 3A. The first region 62 and the second region 64 may be provided in different RAMS.

The second RAM 34 has a first region (also referred to as I-SRAM) 72 for storing firmware of the second CPU 30, a second region (also referred to as D-SRAM) 74 for storing data corresponding to firmware being executed by the second CPU 30, and a storage region of other data. If the second CPU 30 is booted, the second CPU reads the firmware from the second ROM 38, stores the firmware in the first region 72 of the second RAM 34, and executes the firmware. The data generated by executing the firmware is stored in the second region 74 of the second RAM 34. The register 30A is mapped together with the first region 72 and the second region 74 of the second RAM 34 on an address space which can be accessed by the second CPU 30, as illustrated in FIG. 3B.

As illustrated in FIG. 3B, the first region 62 and the second region 64 of the first RAM 32 and the register 28A, in addition to the first region 72 and the second region 74 of the second RAM 34 and the register 30A, are mapped on the address space which can be accessed by the second CPU 30. Accordingly, the second CPU 30 can access the second RAM 34 and the register 30A and can also access the first RAM 32 and the register 28A. That is, the second CPU 30 can rewrite the firmware of the first CPU 28, the data corresponding to the firmware of the first CPU 28, and the data of the register 28A.

Booting Processing

Figure 4:
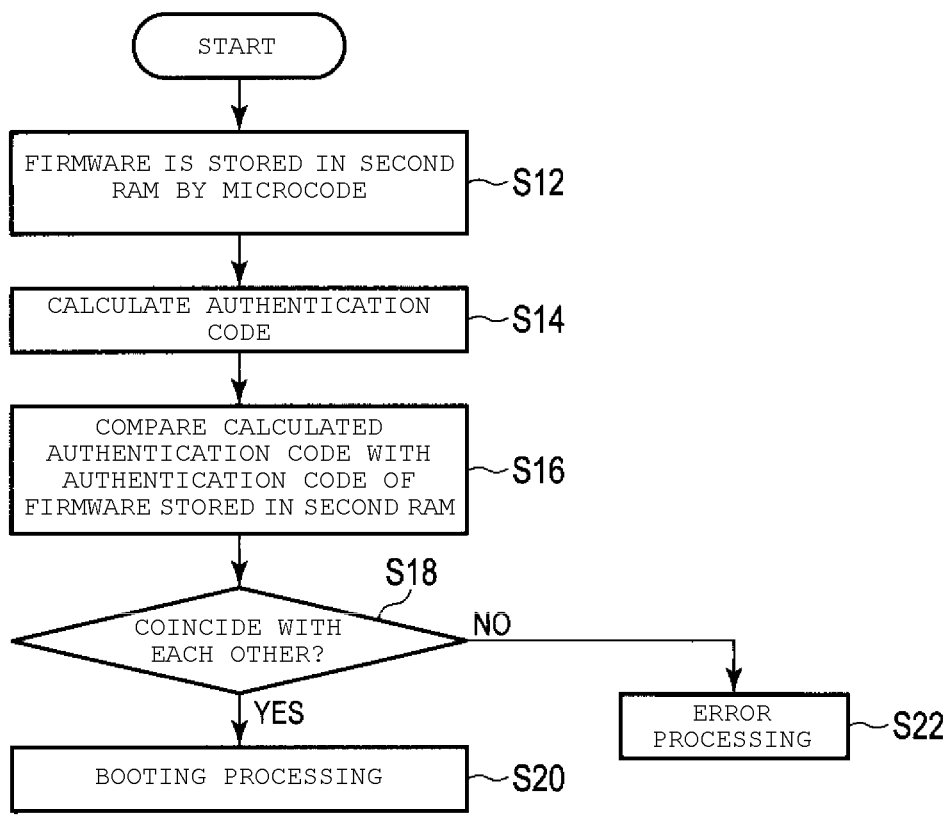
FIG. 4 is a flowchart illustrating an example of booting processing of the second CPU of the electronic apparatus according to the first embodiment.

An example of booting processing of the second CPU 30 will be described with reference to a flowchart of FIG. 4.

In step S12, firmware for booting is read from the second ROM 38 by a microcode implemented by hardware of the second CPU 30, and the firmware is stored in the second RAM 34. The firmware contains an authentication code.

In step S14, the second CPU 30 calculates the authentication code from the firmware which is read from the second ROM 38 and stored in the second RAM 34 in step S12.

In step S16, the second CPU 30 compares the calculated authentication code with the authentication code included in the firmware stored in the second RAM 34 in step S12.

In step S18, the second CPU 30 determines whether or not the two authentication codes coincide with each other. When the two authentication codes coincide with each other (YES in step S18), the booting processing is performed in step S20. When the two authentication codes do not coincide with each other (NO in step S18), error processing is performed in step S22. Since an encryption processing program, which calculates the authentication code for firmware verification, is stored in the second ROM 38, falsification is hard to be made. Accordingly, the second CPU 30 can perform secure booting with a higher security capability than the first CPU 28.

Authentication is not required to boot the first CPU 28.

Data Rewrite Processing

Figure 5:
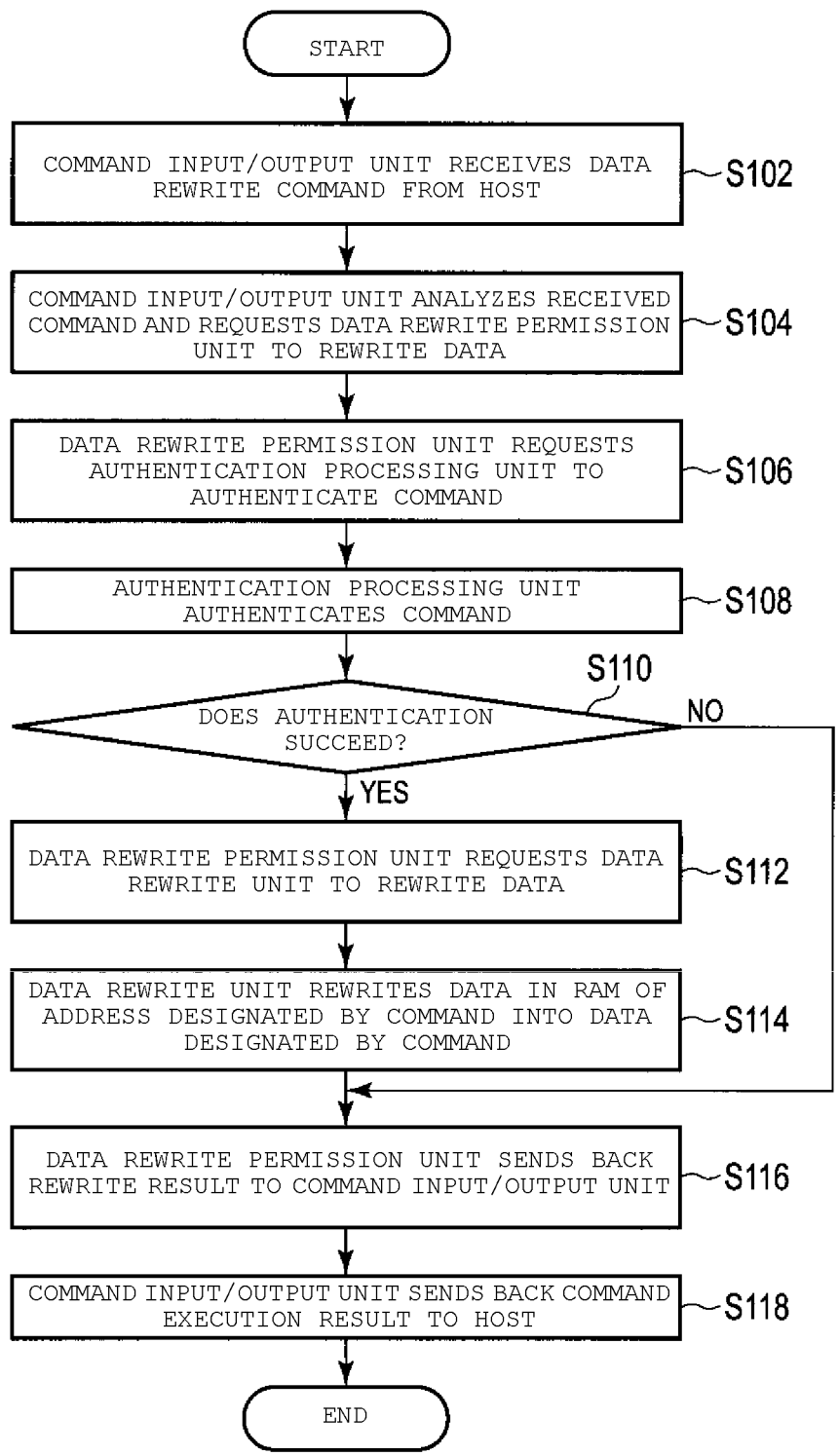
FIG. 5 is a flowchart illustrating an example of a data rewrite operation of the electronic apparatus according to the first embodiment.

FIG. 5 is a flowchart illustrating an example of data rewrite processing according to the first embodiment. Here, an example of data to be rewritten is data corresponding to the firmware of the first CPU 28. It is assumed that the data is stored in the second region 64 of the first RAM 32 or the register 28A. In the embodiment, the data in the second region 64 of the first RAM 32 or the data of the register 28A is rewritten not by the first CPU 28 but by the second CPU 30. Rewriting the data may change processing results of the firmware. That is, the rewrite may substantially change the firmware (some functions may be removed or some functions may be added). In the first embodiment, the data to be rewritten is small data of 1 bit to several bits.

After the first CPU 28 and the second CPU 30 are both booted, the command input/output unit 52 receives a data rewrite command, from the host device 10, for instructing to rewrite specific data in the second region 64 of the first RAM 32 or specific data in the register 28A in step S102. The data rewrite command includes a command type of "data rewrite", a rewrite target address, data to be rewritten, and authentication data. The rewrite target address is a specific address on the address space, which can be accessed from the second CPU 30 as illustrated in FIG. 3B, in which specific data of the rewrite target in the second region 64 of the first RAM 32 or specific data in the register 28A are mapped. The authentication data is unique to the storage device 20.

In step S104, when the command input/output unit 52 analyzes the received command and recognizes that the received command is the data rewrite command, the command input/output unit transmits the data rewrite command to the data rewrite permission unit 54 of the second CPU 30, and requests data rewrite permission unit 54 to rewrite the data.

In step S106, the data rewrite permission unit 54 requests the authentication processing unit 56 to authenticate the data rewrite command.

In step S108, the authentication processing unit 56 authenticates the data rewrite command using an authentication algorithm such as a common key authentication scheme such as AES or a public key authentication scheme such as RSA, based on the authentication data supplied together with the data rewrite command. Since the authentication data is unique to the storage device 20, even if the authentication data leaks, the authentication does not succeed in other storage devices, and a forged data rewrite command is prevented from being executed.

In step S110, the authentication processing unit 56 determines whether or not the authentication succeeds. When the authentication succeeds (YES in step S110), the data rewrite permission unit 54 supplies the data rewrite command to the data rewrite unit 58 in step S112 and requests the data rewrite unit 58 to rewrite data. When the authentication fails (NO in step S110), steps S112 and S114 are not performed, and step S116 is performed.

In step S114, the data rewrite unit 58 rewrites data of the specific address designated by the command, that is, the specific data in the second region 64 of the first RAM 32 or the specific data in the register 28A into the rewrite data designated by the command.

An example of the rewrite is to rewrite specific data (one bit or several bits) which corresponds to the firmware of the first CPU 28 in the second region 64 of the first RAM 32. For example, when the storage device 20 breaks down, in order for the first CPU 28 to perform debugging, it is necessary to read a debugging log from the flash memory 24 using a debugging interface (also referred to as a debugging port). Usually, the firmware of the first CPU 28 cannot use the debugging port. In order for the firmware of the first CPU 28 to be able to use the debugging port, the firmware is required to be changed, but it takes time to change the firmware. The firmware of the first CPU 28 is permitted or not permitted to use the debugging port according to specific control data (herein also referred to as mode). Accordingly, even if the firmware itself is not changed, the firmware of the first CPU 28 can use the debugging port and the firmware of the first CPU 28 can be debugged by rewriting the control data (mode) corresponding to the firmware.

Examples of the debugging port include a joint test action group (JTAG) and a universal asynchronous receiver transmitter (UART). For example, if the control data (mode) is "1", the debugging port JTAG is enabled, and the debugging log can be read from the flash memory 24 via the debugging port. If the control data (mode) is "0", the JTAG is disabled, and the debugging log cannot be read from the flash memory 24 via the debugging port.

The control data (mode) corresponding to the firmware is stored in, for example, the second region 64 of the first RAM 32. An initial value (value at the time of product shipment) of the control data (mode) is "0". As the control data (mode) is rewritten to "1" by executing the data rewrite command, the first CPU 28 can perform debugging.

The control data (mode) corresponding to the firmware of the first CPU 28 is rewritten not based on the firmware of the first CPU 28 but based on the firmware of the second CPU 30 because a security capability of the second CPU 30 is higher. Since the second CPU 30 has a high security at booting time, security is ensured. If the firmware of the first CPU 28 can rewrite the control data (mode) corresponding to the firmware of the first CPU 28, there is a possibility that the control data (mode) can be rewritten maliciously.

In step S116, the data rewrite permission unit 54 sends back a rewrite result representing a rewrite success/rewrite failure to the command input/output unit 52.

In step S118, the command input/output unit 52 sends back the rewrite result to the host device 10. Note that when the authentication fails, the rewrite failure is sent back and the processing may end normally, or abnormally.

The debugging port is configured to be enabled by rewriting the control data (mode) in the second region 64 of the first RAM 32. The embodiment is not limited to this. The debugging port may also be configured to be enabled by rewriting the specific data in the register 28A.

For example, when the specific data of the register 28A is "1", a function for debugging (for example, a command for outputting a debugging log) can be added to the firmware. Although the debugging log can be read, only a part of the debugging log may be output when the other specific data of the register 28A is "0". In such a case, the firmware of the first CPU 28 can read all the debugging logs by setting the data to "1". When another specific data is "0", the debugging log cannot be read via the UART. In this case, if the data is changed to "1", the debugging log may be read via the UART, and debugging may be performed.

The register 28A and the register 30A are mounted outside the first CPU 28 and the second CPU 30. Alternatively, the registers may be embedded in each CPU, or both the embedded register and the externally mounted register may be provided.

Debugging Processing

Figure 6:
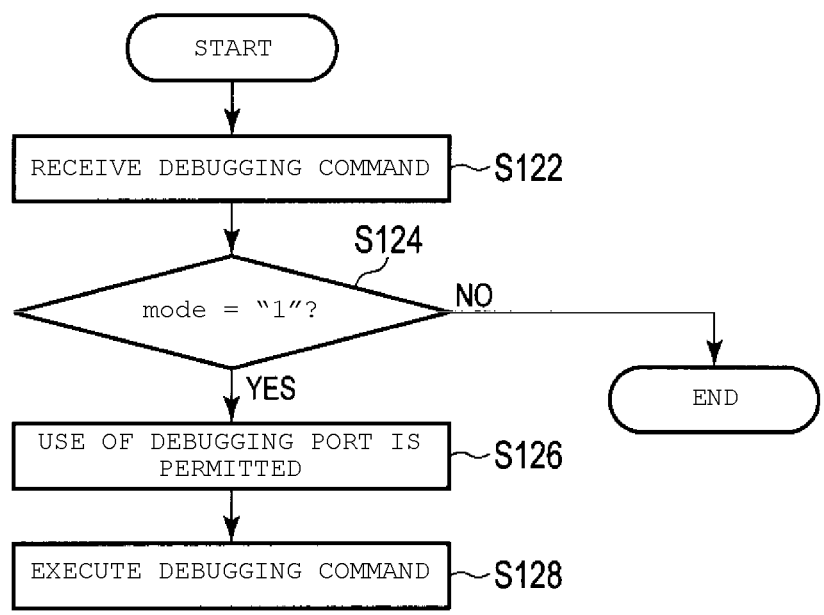
FIG. 6 is a flowchart illustrating an example of a debugging operation of the electronic apparatus according to the first embodiment.

FIG. 6 is a flowchart illustrating an example of the debugging processing according to the first embodiment.

In step S122, the first CPU 28 receives a debugging command from the host device 10 via the command input/output unit 52. Although not illustrated, it is assumed that the first CPU 28 also has an authentication processing unit, authenticates the debugging command, and the authentication succeeds.

In step S124, the first CPU 28 determines whether or not the control data (mode) stored in the second region 64 of the first RAM 32 is "1". When the control data (mode) is "1" (YES in step S124), use of the debugging port is permitted in step S126.

In step S128, the first CPU 28 executes the debugging command by reading a debugging log from the flash memory 24 using the debugging port.

When the control data (mode) is not "1" (NO in step S124), the processing may end abnormally. When the data rewrite processing illustrated in FIG. 5 is not performed before the debugging command is received, the control data (mode) is "0", and thereby, a determination result in step S124 becomes NO.

Conclusion of First Embodiment

According to the first embodiment, the second CPU 30 rewrites data which is in the second region 64 of the first RAM 32 or the register 28A and corresponding to firmware of the first CPU 28, and thereby, a part of a function of the firmware is changed (includes addition and removal of the function). An example of the added function is use permission of a debugging port, which enables the first CPU 28 to perform debugging. Although the use of the debugging port remains permitted after end of the debugging, if the storage device 20 is shut down, data of the first RAM 32 and the register 28A are lost. That is, since the modified control data (mode) stored in the second region 64 of the first RAM 32 or the register 28A is volatilized and not perpetuated, a state where the use of the debugging port is permitted is ended by the shutdown. Next, when the storage device 20 is booted, the use of the debugging port is not permitted because the initial value of the control data (mode) is "0".

As described above, if the storage device 20 is shut down, the control data (mode) stored in the second region 64 of the first RAM 32 or the register 28A returns to the initial value indicating that the use of the debugging port is not permitted. Accordingly, even if the storage device 20 is leaked in which the firmware according to the embodiment is installed and the use of the debugging port is permitted, the use of the debugging port becomes not permitted when being shut down. As a result, the security protection of the storage device 20 is maintained. In a case where a defective product is not recalled for debugging but is debugged at a user's site, even if firmware, which allows the use of the debugging port, is taken from a manufacturer's site, that is, even if such firmware is leaked, it is impossible to read data maliciously once the storage device in which such firmware is installed is shut down.

In addition, since the data of the first RAM 32 or the register 28A of the first CPU 28 can be rewritten by the second CPU 30 where secure booting can be performed, illegal rewriting is less likely to be performed compared to a case in which the data of the first RAM 32 or the register 28A is rewritten by the first CPU 28.

Second Embodiment

Functional Configuration

Figure 7:
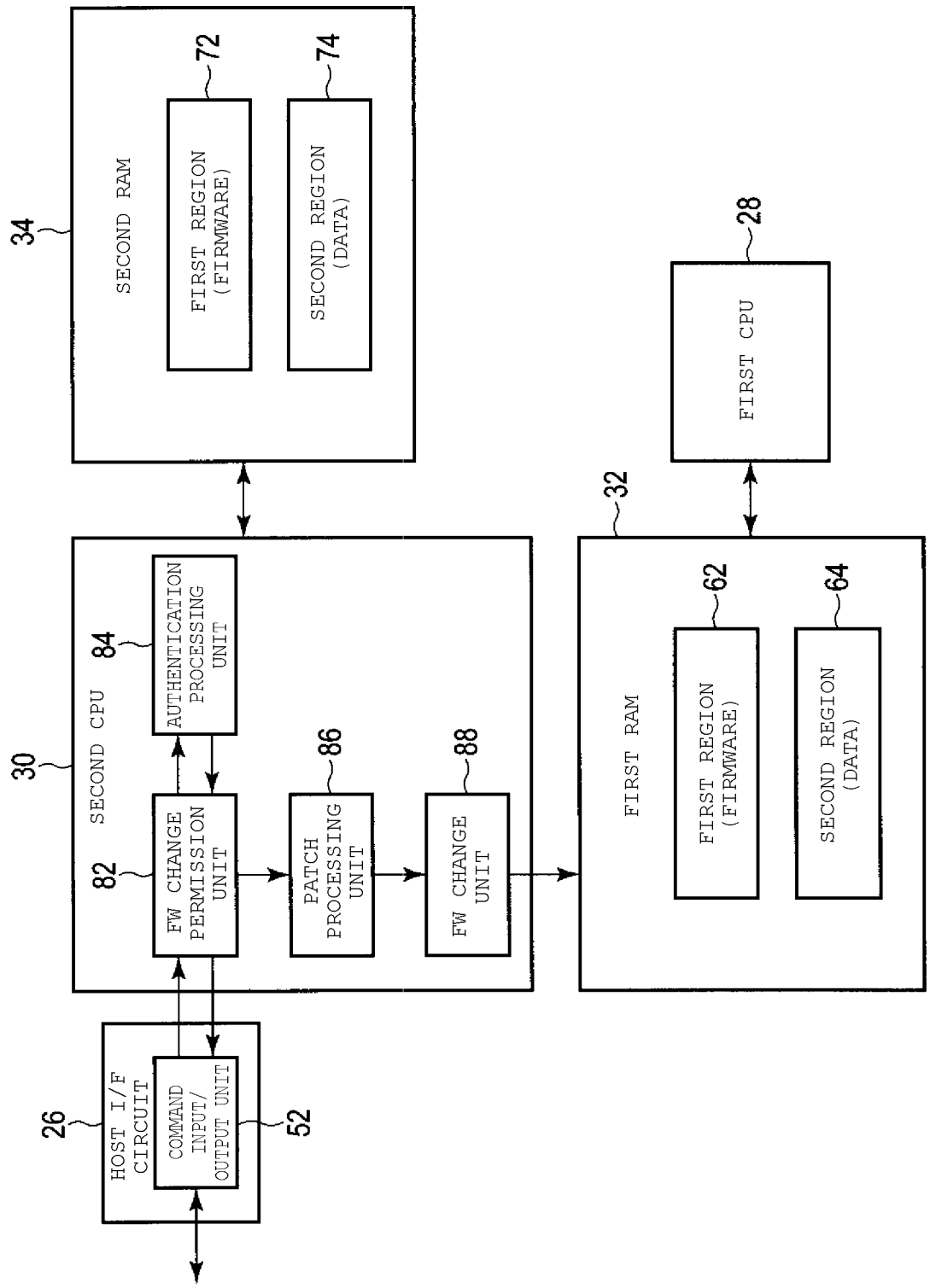
FIG. 7 is a block diagram illustrating an example of a functional configuration of a second CPU of an electronic apparatus according to a second embodiment.

FIG. 7 is a block diagram illustrating an example of a functional configuration of a second CPU 30 according to a second embodiment. Since the embodiment of FIG. 7 is substantially similar to the embodiment of FIG. 2, only the difference will be described in FIG. 7.

In the first embodiment, a rewrite target is data including the firmware of the first CPU 28 in the second region 64 of the first RAM 32 or the register 28A, and the rewrite target may include a relatively small number of bits. In the second embodiment, a rewrite target is a part or all of the firmware of the first CPU 28 in the first region 62 of the first RAM 32.

The second CPU 30 includes an firmware (FW) change permission unit 82, an authentication processing unit 84, a patch processing unit 86, and an FW change unit 88. The FW change permission unit 82, the authentication processing unit 84, the patch processing unit 86, and the FW change unit 88 may be implemented by the second CPU 30 executing the firmware. However, the FW change permission unit 82, the authentication processing unit 84, the patch processing unit 86, and the FW change unit 88 may also be implemented by individual hardware.

Firmware Change (Rewrite) Processing

Figure 8:
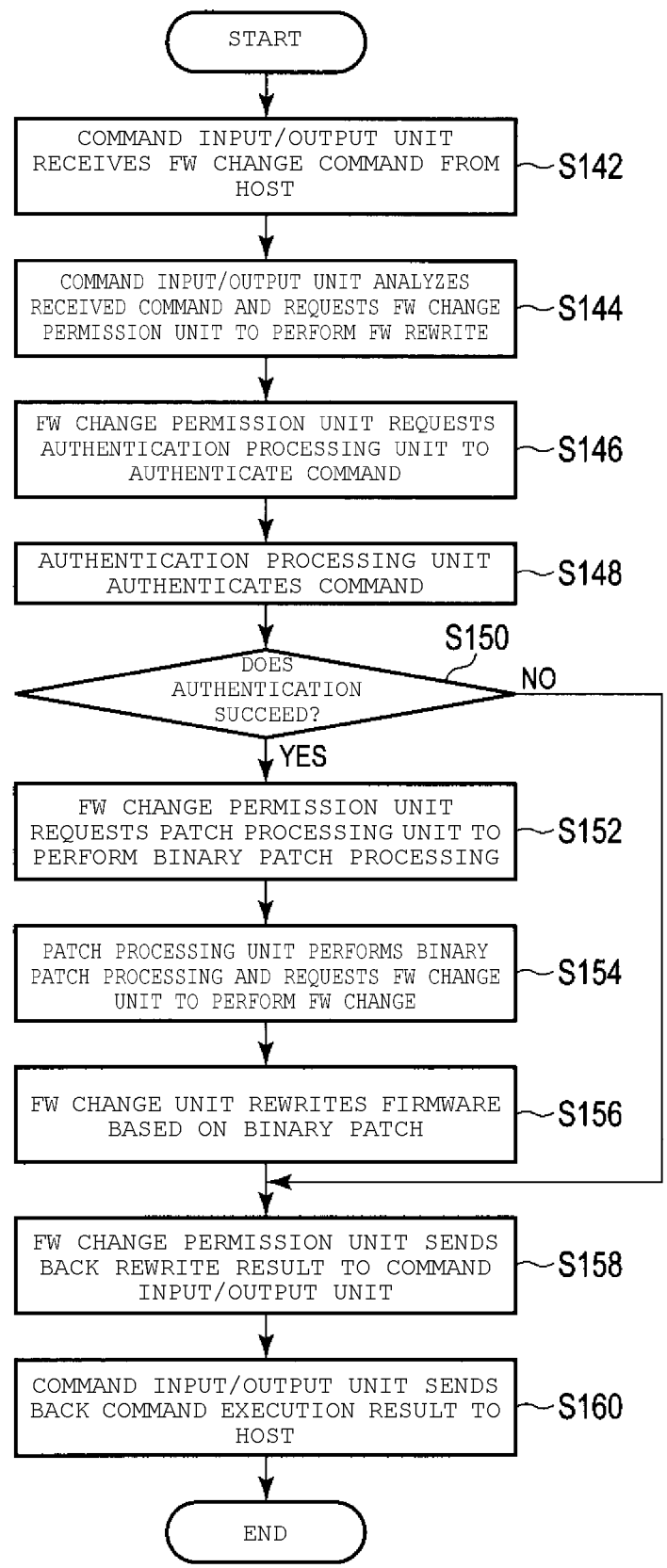
FIG. 8 is a flowchart illustrating an example of a firmware change operation of the electronic apparatus according to the second embodiment.

FIG. 8 is a flowchart illustrating an example of firmware change processing according to the second embodiment. The second embodiment may change the entire firmware. Alternatively, if the purpose is only to enable debugging, only a part of the firmware may be rewritten.

In step S142, the command input/output unit 52 receives a FW change command targeting firmware in the first region 62 of the first RAM 32, from the host device 10. The FW change command includes a command type of a "FW change", a rewrite target address, data to be rewritten (a part of the FW to be changed), and authentication data. The address is a specific address on an address space, which is accessible by the second CPU 30 as illustrated in FIG. 3B, to which the first region 62 of the first RAM 32 is mapped.

When the command input/output unit 52 analyzes the received command in step S144 and recognizes that the received command is the FW change command, the command input/output unit transmits the FW change command to the FW change permission unit 82 and requests the FW change permission unit 82 to perform a FW change.

In step S146, the FW change permission unit 82 requests the authentication processing unit 84 to authenticate the FW change command.

In step S148, the authentication processing unit 84 authenticates the FW change command using an authentication algorithm, for example, a common key authentication method such as AES, a public key authentication method such as RSA, or the like, based on authentication data supplied together with the FW change command.

In step S150, the authentication processing unit 84 determines whether or not the authentication succeeds. When the authentication fails (NO in step S150), steps S152, S154, and S156 are not performed, and step S158 is performed. When the authentication succeeds (YES in step S150), the FW change permission unit 82 supplies a FW change command to the patch processing unit 86 in step S152 and requests the patch processing unit 86 to perform binary patch processing. The rewrite data included in the FW change command indicates a change of the firmware and indicates, for example, how to change which byte of the firmware.

In step S154, the patch processing unit 86 obtains a binary patch and requests the FW change unit 88 to change the FW. The binary patch is a difference between binary codes of the firmware before and after the change. Various methods are known for obtaining the binary patch. For example, a method called radiff2 may be used.

In step S156, the FW change unit 88 changes a part or all of the firmware of the first CPU 28 in the first region 62 of the first RAM 32 based on the binary patch. Generally in a firmware update, the firmware in the ROM is rewritten. However, in the second embodiment, the rewritten firmware stored in the first region 62 of the first RAM 32 is not written back to the first ROM 36.

In step S158, the FW change permission unit 82 sends back a rewrite result indicating rewrite success/rewrite failure to the command input/output unit 52.

In step S160, the command input/output unit 52 sends back the rewrite result to the host device 10. Note that when the authentication fails, the rewrite failure is sent back and the processing may end normally or abnormally.

One example of the change of the firmware is to omit a determination step of the control data (mode) illustrated in step S124, for example, in the firmware for performing the debugging processing illustrated in FIG. 6. If the firmware is changed in this way, if a debug command is received in step S122 and the authentication succeeds, use of the debugging port is permitted in step S126 regardless of the control data (mode). Thereby, when the debug command is received, the firmware of the first CPU 28 can use the debugging port, and debugging can be performed accordingly. All of the firmware or a part of the firmware may be changed.

Conclusion of Second Embodiment

Also in the second embodiment, a part or all of the firmware in the first region 62 of the first RAM 32 is rewritten by the second CPU 30, and thereby, a function of the first CPU 28 can be changed. As in the first embodiment, for example, the change of the function is use permission of the debugging port, which enables the first CPU 28 to perform debugging. Since the rewritten firmware stored in the first region 62 of the first RAM 32 is not written back to the first ROM 36, the firmware in the first ROM 36 remains as an original state (including the determination step of the control data (mode) illustrated in step S124, for example). If step S124 is omitted by rewriting the firmware, the use of the debugging port remains enabled even after end of the debugging, but if the storage device 20 is shut down, data in the first RAM 32 is lost. That is, since the changed part of the firmware stored in the first region 62 of the first RAM 32 is volatilized and is not perpetuated, a state in which the use of the debugging port is permitted is ended by the shutdown. When the storage device 20 is booted next, the firmware in the first ROM 36 remains as an original state, and thereby, a determination step of the control data (mode) illustrated in step S124 of FIG. 6 is performed. Since the control data (mode) has an initial value of "0", the use of the debugging port is not permitted.

As such, the changed firmware stored in the first region 62 of the first RAM 32 is volatilized at the time of the shutdown. Accordingly, even if the firmware for which the use of the debugging port is permitted once or the storage device 20 in which the firmware is installed is leaked, the use of the debugging port is not permitted if the storage device is shut down. As a result, security protection of the storage device is maintained.

In addition, since the data of the first RAM 32 of the first CPU 28 can be rewritten by the second CPU 30 that can perform secure booting, possibility of illegal rewriting is extremely low compared to rewriting the data of the first RAM 32 by using the first CPU 28.

According to the second embodiment, an effect equivalent to a case where the entire firmware is updated is obtained by changing only a part of the firmware. For example, a function, a code, and a command other than enablement/disablement of the debugging port can be easily added or changed, and a function of outputting debugging print via the UART interface can also be added.

In a general firmware update, the operable firmware ends once, and the updated firmware is stored in a ROM. At the next start-up, a copy of the updated firmware is written to the RAM, and the firmware on the RAM starts up the CPU. Accordingly, if the updated firmware does not operate normally, the CPU does not start up, which causes a problem. However, if a part or all of the operable firmware on the RAM is changed as in the second embodiment, even when the updated firmware does not operate normally and the CPU does not start up, the original firmware in the ROM can start up the CPU, and thereby, it is also possible to guarantee the operation of the changed firmware.

Third Embodiment

Entire Configuration

In the first and second embodiments, the first RAM 32 and the first ROM 36 for the first CPU 28, and the second RAM 34 and the second ROM 38 for the second CPU 30 are provided, the firmware of the first CPU 28 is stored in the first ROM 36, and the firmware of the second CPU 30 is stored in the second ROM 38. In contrast to this, in a third embodiment, a RAM and a ROM dedicated to the second CPU 30 are not provided, the second CPU 30 is configured to access a partial address region of the RAM and ROM for the first CPU 28. An address region of the RAM and ROM accessed by the second CPU 30 is different from an address region of the RAM and ROM accessed by the first CPU 28.

Figure 9:
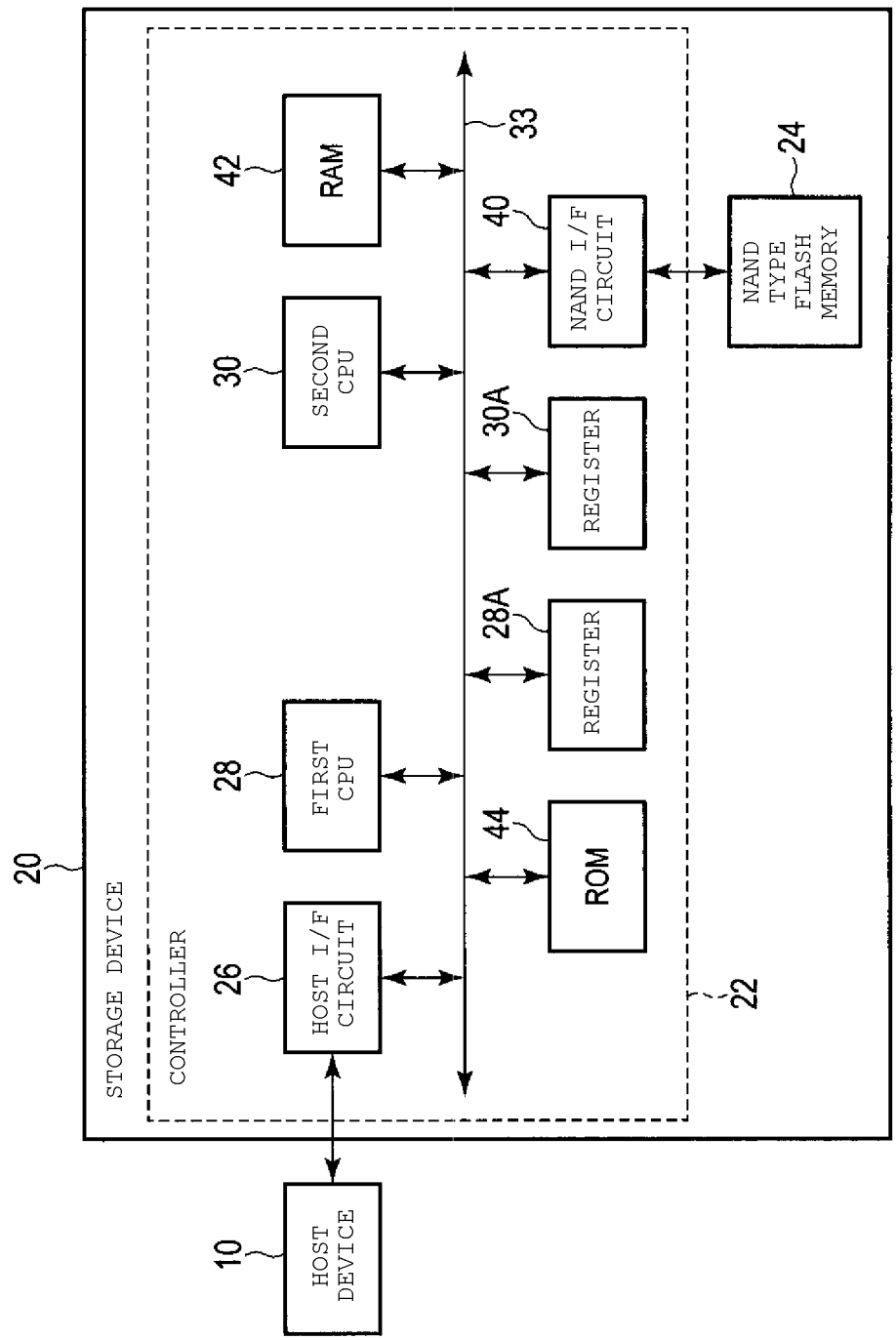
FIG. 9 is a block diagram illustrating an example of a configuration of an electronic apparatus according to a third embodiment.

As illustrated in FIG. 9, a controller 22 according to the third embodiment includes a host I/F circuit 26, a first CPU 28, a register 28A, a second CPU 30, a register 30A, a RAM 42, a ROM 44, and a NAND I/F circuit 40.

The RAM 42 is a volatile memory used as a work area of the first CPU 28 and the second CPU 30. The RAM 42 is implemented by an SRAM in the controller 22. Alternatively, the RAM 42 may be implemented by a DRAM provided outside the controller 22. The ROM 44 is a nonvolatile memory that stores firmwares of the first CPU 28 and the second CPU 30 and information for authentication. The ROM 44 may be configured with a writable ROM, for example, a NOR type serial flash memory, or an optically writable ROM. When the ROM 44 is implemented by the NOR type serial flash memory, the first CPU 28 may write a debugging log to the ROM 44 instead of the flash memory 24.

Function Configuration

Figure 10:
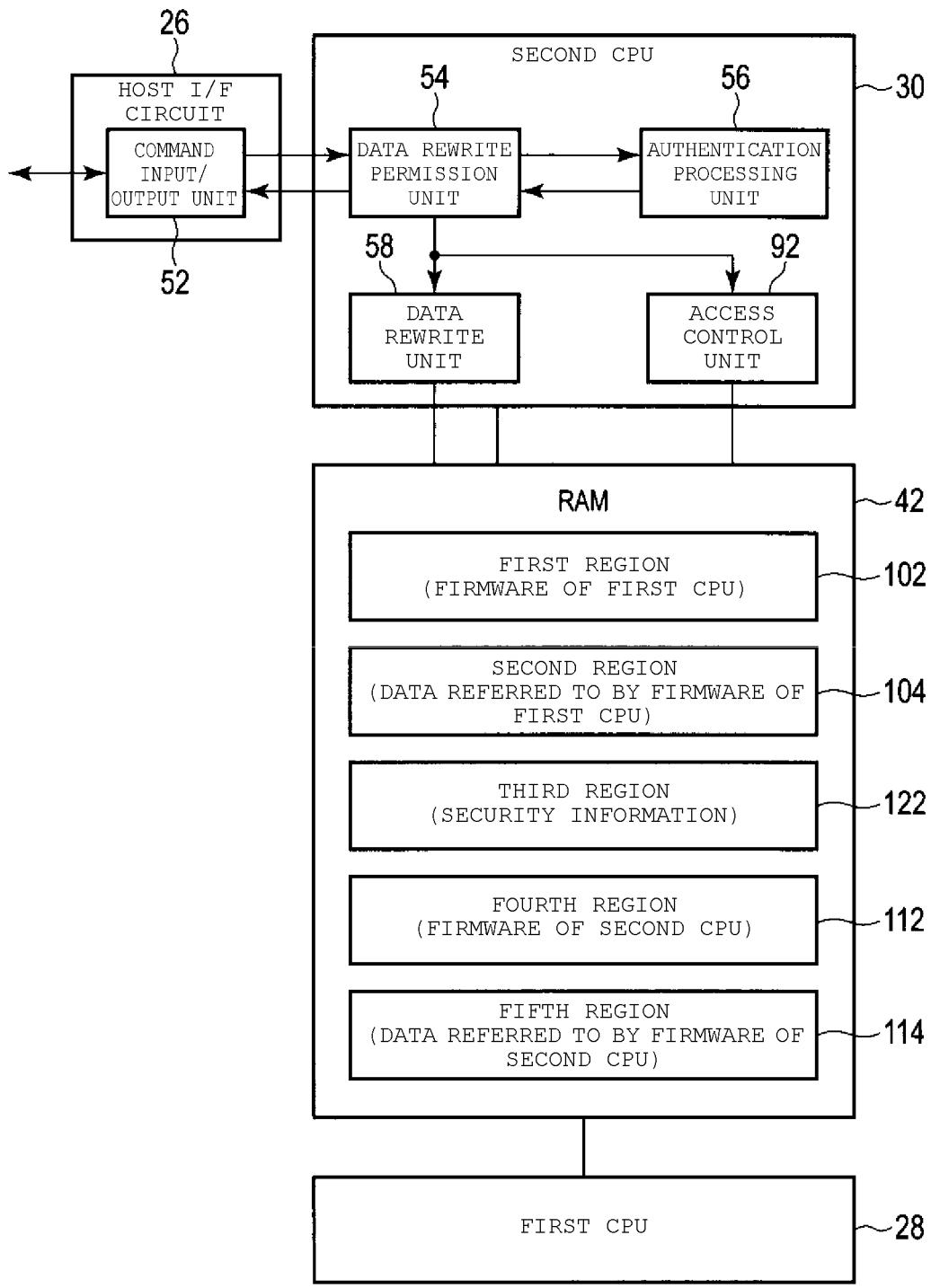
FIG. 10 is a block diagram illustrating an example of a functional configuration of a second CPU of the electronic apparatus according to the third embodiment.

FIG. 10 is a block diagram illustrating an example of a functional configuration of the second CPU 30 according to the third embodiment. The third embodiment may include modification of the first embodiment and modification of the second embodiment. Although FIG. 10 illustrates the modification of the first embodiment, the modification of the second embodiment may also be implemented as the third embodiment in the same manner.

The host I/F circuit 26 includes the command input/output unit 52. The second CPU 30 includes the data rewrite permission unit 54, the authentication processing unit 56, the data rewrite unit 58, and an access control unit 92. The data rewrite permission unit 54, the authentication processing unit 56, the data rewrite unit 58, and the access control unit 92 may be implemented by the second CPU 30 executing firmware. The access control unit 92 is implemented by a memory protection unit MPU. The access control unit 92 can set a specific region of the RAM 42 as an access prohibition region. If the specific address on an address space accessible from the second CPU 30 is requested to access by a command from the host device 10, the access control unit 92 sends back an error signal to the host device 10. Alternatively, the data rewrite permission unit 54, the authentication processing unit 56, the data rewrite unit 58, and the access control unit 92 may be implemented by individual hardware.

The RAM 42 includes a first region 102 for storing the firmware of the first CPU 28, a second region 104 for storing data corresponding to the firmware of the first CPU 28, a third region 122 for storing security information (such as an encryption key) of the first CPU 28, a fourth region 112 for storing the firmware of the second CPU 30, a fifth region 114 for storing data corresponding to the firmware of the second CPU 30, and a storage region for other data.

Figure 11A:
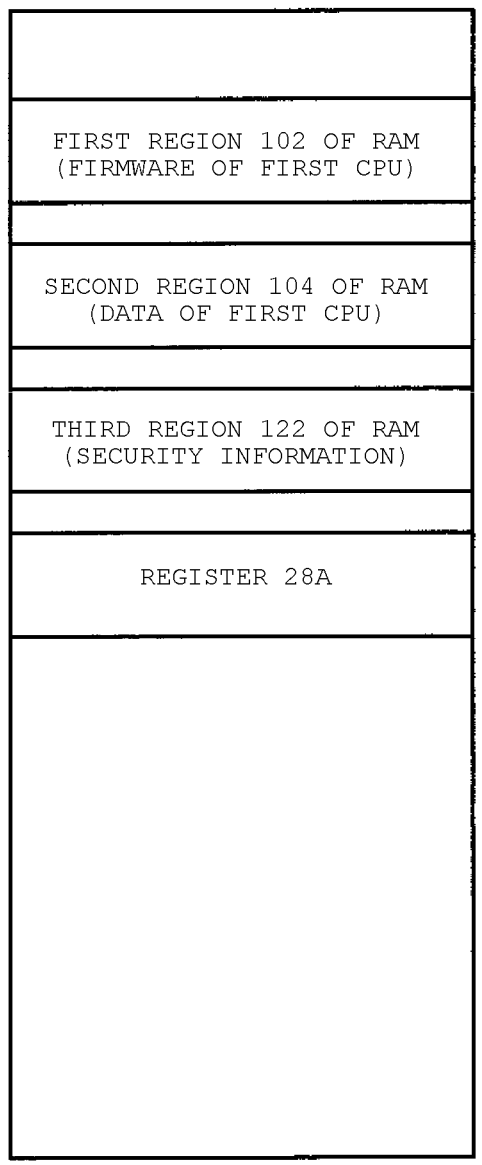
FIGS. 11A and 11B are diagrams illustrating examples of address maps of a first CPU and the second CPU of the electronic apparatus according to the third embodiment.
Figure 11B:
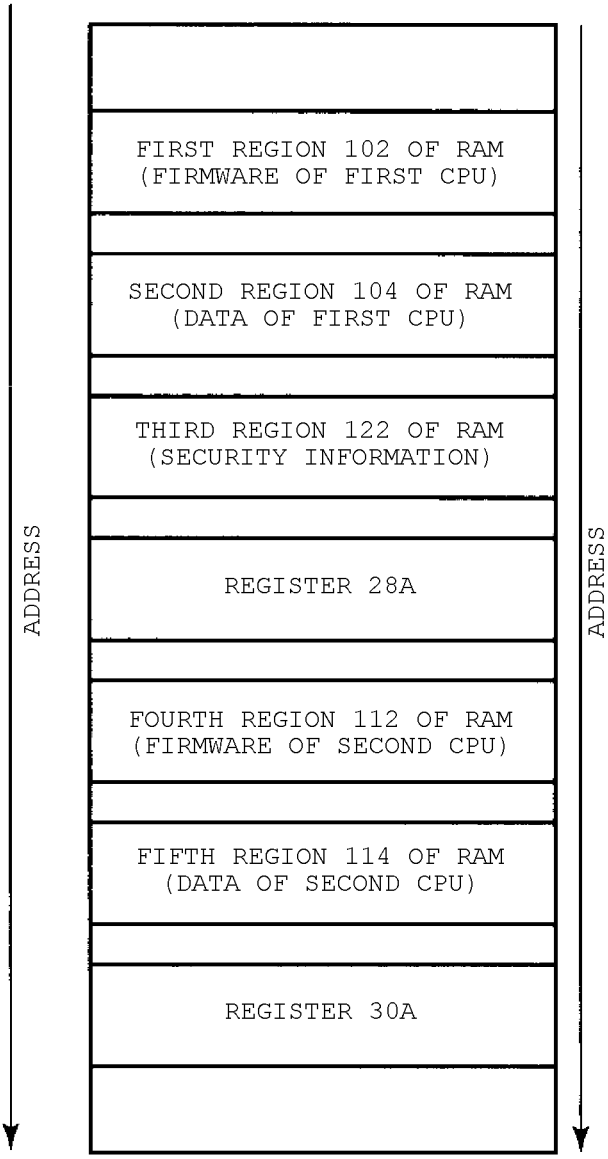

If the first CPU 28 is booted, the first CPU reads firmware from the ROM 44, stores the firmware in the first region 102 of the RAM 42, and executes the firmware read from the RAM 42. Data generated by executing the firmware is stored in the second region 104 of the RAM 42. The register 28A is mapped together with the first region 102, the second region 104, and the third region 122 of the RAM 42 on an address space which can be accessed by the first CPU 28, as illustrated in FIG. 11A. The address space which can be accessed by the first CPU 28 does not include addresses to which the fourth region 112 and the fifth region 114 of the RAM 42 and the register 30A are mapped. As illustrated in FIG. 11B, the first region 102 and the second region 104 of the RAM 42 and the register 28A are mapped in the address space which can be accessed by the second CPU 30 in addition to the fourth region 112, the fifth region 114 of the RAM 42 and the register 30A. Accordingly, the second CPU 30 can access the storage regions 102, 104, and 122 related to the first CPU 28 and the register 28A in addition to the storage regions 112 and 114 related to the second CPU 30 and the register 30A. However, when the third region 122 for storing security information is set as an access prohibition region by the access control unit 92, the second CPU 30 cannot access the third region 122.

Data Rewrite Processing

Figure 12:
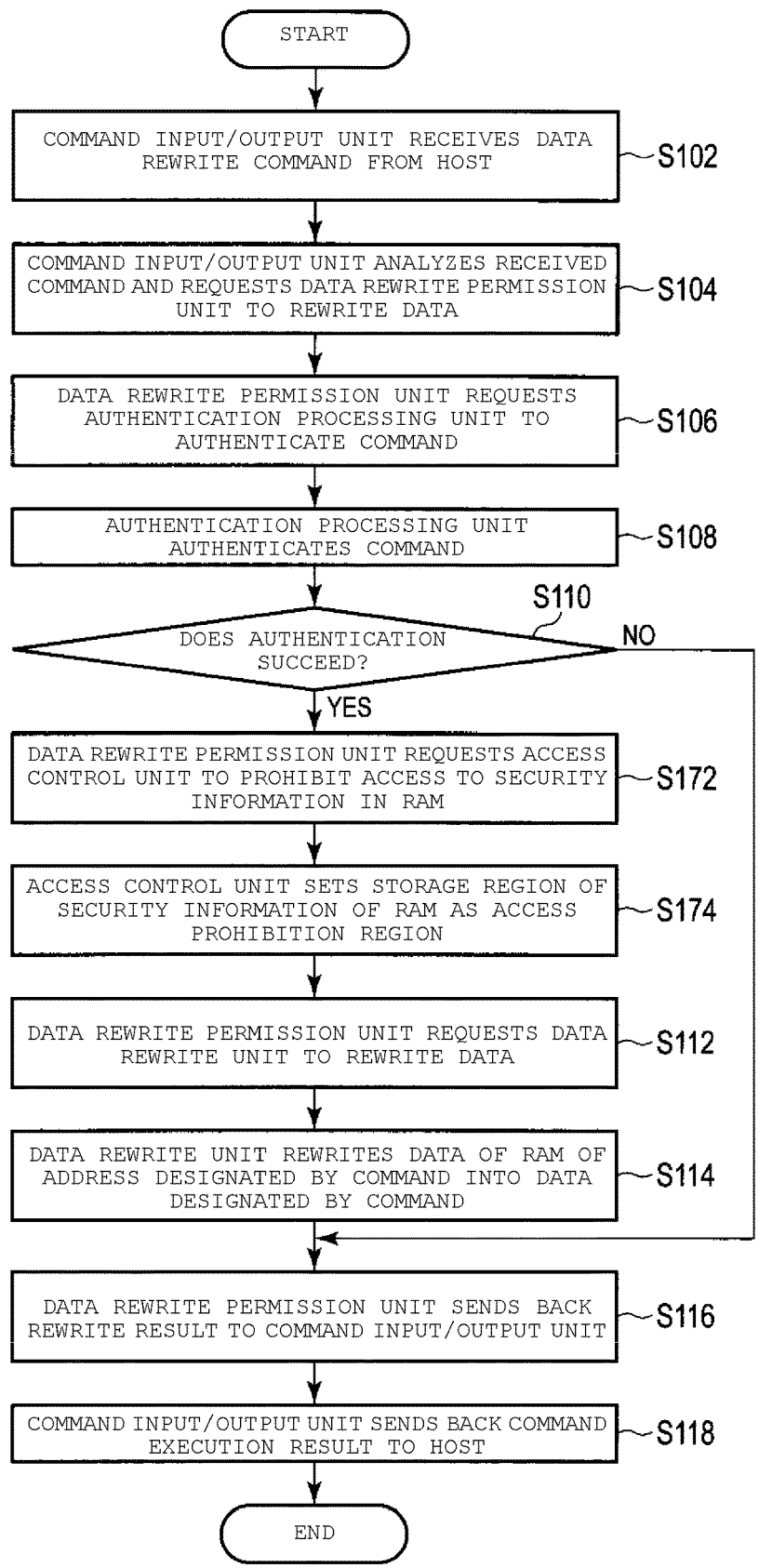
FIG. 12 is a flowchart illustrating an example of a data rewrite operation of the electronic apparatus according to the third embodiment.

FIG. 12 is a flowchart illustrating an example of data rewrite processing according to the third embodiment. FIG. 12 is substantially the same as the flowchart according to the first embodiment illustrated in FIG. 5, and only different parts will be described.

When authentication succeeds in step S110 (YES in step S110), the data rewrite permission unit 54 requests the access control unit 92 to prohibit an access to the third region 122 such that the security information in the RAM 42 is not accessed in step S172.

In step S174, the access control unit 92 sets the third region 122 storing the security information in the RAM 42 as the access prohibition region. Thereafter, if the second CPU 30 accesses the third region 122 of the RAM 42, an error signal is sent back to the host device 10. Thereby, the second CPU 30 cannot read the security information such as an encryption key, from the RAM 42.

Thereafter, the data rewrite permission unit 54 supplies a data rewrite command to the data rewrite unit 58 in step S112 and requests the data rewrite unit 58 to rewrite the data as in the first embodiment.

Conclusion of Third Embodiment

In the first embodiment, if a debugging port is enabled by data rewrite, security information such as an encryption key can also be read, and if a user other than the person in charge of debugging reads the security information, security of a storage device might not be ensured even little chance. However, according to the third embodiment, although the debugging port is enabled by data rewrite, since the third region 122 for storing the security information is prohibited to access (read prohibition), security of the storage device is reliably ensured. Even if the second CPU 30 reads the encrypted data in the flash memory 24, since an encryption key is not known, decryption cannot be performed, and the security of the storage device is maintained.

FIG. 12 illustrates a modification example of the first embodiment in which data that is in the RAM 42 or the register 28A and corresponds to firmware of the first CPU 28 is rewritten. The second embodiment in which a part or all of the firmware of the first CPU 28 in the RAM 42 is changed may also be modified in the same manner as in the first embodiment.

While the above description relates to an encryption type storage device 20, the disclosure is also applicable to non-encryption type storage device. The storage device is described as an electronic apparatus. Alternatively, the disclosure is applicable to any electronic apparatus having a data storage function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first hardware processor;
a second hardware processor with a security capability higher than a security capability of the first hardware processor;
a first hardware memory that is nonvolatile and configured to store a program which is to be executed by the first hardware processor, the first hardware memory including a first region configured to store the program and a second region configured to store log data of the electronic apparatus;
a second hardware memory that is volatile and configured to store the program, data that is to be referred to by the first hardware processor while the first hardware processor executes the program, and control data indicating whether to permit the log data to be read from the second region; and
a command execution circuit configured to set a specific region of the second hardware memory as an access prohibition region before a rewrite command is executed, the rewrite command requesting to change data in the second hardware memory, the rewrite command including a command configured to change a value of the control data stored in the second hardware memory into a value indicating that the log data is permitted to be read from the second region, the specific region of the second hardware memory including a region configured to store security information of the first hardware processor,
wherein the second hardware processor is configured to authenticate the rewrite command, selectively execute the rewrite command based on the authentication, and execute the rewrite command if the authentication succeeds.

2. The electronic apparatus according to claim 1,
wherein the second hardware processor is configured to perform secure booting processing.

3. The electronic apparatus according to claim 1,
wherein an initial value of the control data is configured to indicate that the log data is not permitted to be read from the second region.

4. The electronic apparatus according to claim 1,
wherein the control data includes data indicating whether to permit use of an interface for outputting the log data.

5. The electronic apparatus according to claim 1,
wherein the first hardware memory includes a first region configured to store the program and a second region configured to store log data of the electronic apparatus, the program stored in the first region not permitting the log data to be read from the first hardware memory,
wherein the second hardware memory includes a third region configured to store the program read from the first region,
wherein the rewrite command includes a command configured to change at least a part of the program stored in the third region to permit the log data to be read from the second region,
wherein the second hardware processor is configured to execute the rewrite command if the authentication succeeds.

6. The electronic apparatus according to claim 5,
wherein the rewrite command includes a command configured to change at least a part of the program stored in the third region to permit use of an interface for outputting the log data.

7. The electronic apparatus according to claim 1,
wherein the rewrite command includes a command configured to change data of a register that is to be referred to by the first hardware processor while the first hardware processor executes the program.

8. A control method, comprising:
storing, in a first hardware memory that is nonvolatile, a program to be executed by a first hardware processor, wherein the first hardware memory includes a first region configured to store the program and a second region configured to store log data of the electronic apparatus;
storing, in a second hardware memory that is volatile, the program and data that is to be referred to by the first hardware processor while the first hardware processor executes the program and control data indicating whether to permit the log data to be read from the second region;
setting, by a command execution circuit, a specific region of the second hardware memory as an access prohibition region before a rewrite command is executed, wherein the specific region of the second hardware memory includes a region configured to store security information of the first hardware processor;
authenticating, by a second hardware processor with a security capability higher than a security capability of the first hardware processor, the rewrite command requesting to change the data in the second hardware memory, wherein the rewrite command includes a command configured to change a value of the control data stored in the second hardware memory into a value indicating that the log data is permitted to be read from the second region; and
selectively executing, by the second hardware processor, the rewrite command based on the authentication;
executing, by the second hardware processor, the rewrite command if the authentication succeeds.

9. The method according to claim 8, further comprising:
performing, by the second hardware processor, secure booting processing.

10. The method according to claim 8,
wherein an initial value of the control data is configured to indicate that the log data is not permitted to be read from the second region.

11. The method according to claim 8,
wherein the control data includes data indicating whether to permit use of an interface for outputting the log data.

12. The method according to claim 8,
wherein the first hardware memory includes a first region configured to store the program and a second region configured to store log data of the electronic apparatus, the program stored in the first region not permitting the log data to be read from the first hardware memory,
wherein the second hardware memory includes a third region configured to store the program read from the first region, and
wherein the rewrite command includes a command configured to change at least a part of the program stored in the third region to permit the log data to be read from the second region, the method further comprising:
executing, by the second hardware processor, the rewrite command if the authentication succeeds.

13. The method according to claim 12,
wherein the rewrite command includes a command configured to change at least a part of the program stored in the third region to permit use of an interface for outputting the log data.

14. The method according to claim 8,
wherein the rewrite command includes a command configured to change data of a register that is to be referred to by the first hardware processor while the first hardware processor executes the program.

* * * * *